(12) United States Patent
Dodate et al.

(10) Patent No.: US 10,444,061 B2
(45) Date of Patent: Oct. 15, 2019

(54) OVERLOAD PREVENTION MECHANISM

(71) Applicant: A&D COMPANY, LIMITED, Tokyo (JP)

(72) Inventors: Yutaka Dodate, Saitama (JP); Naoto Izumo, Saitama (JP)

(73) Assignee: A&D COMPANY, LIMITED, Saitama (JP)

( * ) Notice: Subject to any disclaimer, the term of this patent is extended or adjusted under 35 U.S.C. 154(b) by 139 days.

(21) Appl. No.: 15/709,565

(22) Filed: Sep. 20, 2017

(65) Prior Publication Data

US 2018/0003548 A1 Jan. 4, 2018

Related U.S. Application Data

(63) Continuation of application No. PCT/JP2015/059381, filed on Mar. 26, 2015.

(51) Int. Cl.
| | |
|---|---|
| *G01G 23/00* | (2006.01) |
| *G01G 21/23* | (2006.01) |
| *G01G 23/02* | (2006.01) |
| *G01G 23/06* | (2006.01) |

(52) U.S. Cl.
CPC .......... *G01G 23/005* (2013.01); *G01G 21/23* (2013.01); *G01G 23/02* (2013.01); *G01G 23/06* (2013.01)

(58) Field of Classification Search
CPC ...... G01G 23/005; G01G 21/23; G01G 23/02; G01G 23/06
USPC .......................................................... 177/212
See application file for complete search history.

(56) References Cited

U.S. PATENT DOCUMENTS

| | | | | |
|---|---|---|---|---|
| 8,648,267 B2* | 2/2014 | Honda | ................. | G01G 21/244 |
| | | | | 177/211 |
| 9,046,408 B2* | 6/2015 | Chan | ......................... | G01G 3/14 |
| 10,139,266 B2* | 11/2018 | Scheu | ..................... | G01G 21/22 |
| 2004/0035228 A1* | 2/2004 | Viot | ..................... | B01L 3/0224 |
| | | | | 73/864.18 |

(Continued)

FOREIGN PATENT DOCUMENTS

| | | |
|---|---|---|
| JP | 11-048183 A | 2/1999 |
| JP | 2002-214030 A | 7/2002 |
| JP | 2009-244129 A | 10/2009 |

OTHER PUBLICATIONS

International Search Report and Written Opinion dated Apr. 28, 2015 in the corresponding application PCT/JP2015/059381.

*Primary Examiner* — Natalie Huls
*Assistant Examiner* — Monica S Young
(74) *Attorney, Agent, or Firm* — Roberts Mlotkowsi Safran Cole & Calderon, P.C (57) ABSTRACT

Provided is an overload prevention mechanism including a load receiving part provided with a flange having at least three ribs on the upper surface of the flange; a pedestal located below the load receiving part; an elastic body which has one end in contact with the load receiving part and the other end in contact with the pedestal, and which biases the load receiving part and the pedestal in such a direction that the load receiving part and the pedestal are separated from each other; and a connection member having on the lower surface thereof recessed grooves which engage with the ribs. The three or more ribs are disposed so as to restrict inclination and rattling of the load receiving part due to a load applied to the load receiving part.

12 Claims, 5 Drawing Sheets

(56) References Cited

U.S. PATENT DOCUMENTS

| | | | | |
|---|---|---|---|---|
| 2005/0045388 A1* | 3/2005 | Burkhard | ............. | G01G 23/005 |
| | | | | 177/187 |
| 2006/0289207 A1* | 12/2006 | Burkhard | ............. | G01G 23/005 |
| | | | | 177/154 |
| 2017/0074719 A1* | 3/2017 | Izumo | .................... | G01G 21/28 |

* cited by examiner

OVERLOAD PREVENTION MECHANISM

This is a continuation of International Application PCT/JP2015/059381, filed on Mar. 26, 2015.

BACKGROUND OF THE INVENTION

Field of the Invention

The present invention relates to an overload prevention mechanism for a weighing apparatus. The overload prevention mechanism can prevent inclination of a weighing dish, reduce rattling in a rotational direction of the weighing dish, and thereby protect the highly precise electronic balance and the like from an instantaneous large load applied to a weighing dish thereof, besides be easily manufactured.

Description of the Related Art

Conventionally, an overload prevention mechanism (cushioning mechanism, shock absorber) has been also mounted in a weighing apparatus incorporated in a manufacturing line and the like, and a kind of overload prevention mechanism have realized omnidirectional release of overload (Patent Literature 1). A highly precise balance such as an electromagnetic-force-balancing electronic balance can measure a slight weight, for example, one several thousandths of a gram, one several-tens thousandth of a gram. In such balance, a mechanism for measuring material is configured very precisely. Accordingly, the mechanism may be broken due to a large load or instantaneous load.

In particular, in the case of a small-sized weighing apparatus, a weighing dish has been positioned in the vertical direction by a shaft of a load receiving part supporting the weighing dish at the position near the center of the weighing dish. Accordingly, even slight inclination of the shaft act on the weighing dish as more significant inclination. Also, the weighing dish is positioned in the rotational direction by receiving a pin which penetrates the shaft of the load receiving part with U-shaped groove at the portion near the center of the weighing dish. Accordingly, as with the inclination, rattling of the shaft appears at the end surface of the weighing dish as more significant rattling.

Such inclination and rattling in the rotational direction of the weighing dish were sometimes problematic in a weighing apparatus incorporated in equipment such as manufacturing line. In particular, this problem is more remarkable, for example, when a user uses the weighing apparatus with a long receiving jig added to the weighing dish.

As another conventional art, a cushioning device which is configured to be positioned in the vertical and rotational directions by three pins arranged at equal intervals in the circumferential direction and in which notches for receiving the pins are formed in a member serving as a weighing dish has been proposed (Patent Literature 2). However, as shown in FIGS. 1 and 4 of Patent Literature 2, it is necessary for the weighing dish of weighing apparatus to cut and form triangular pin positioning notches 23 and pin guiding grooves 24 continuous with the pin positioning notches 23 in the receiving member 20. As a result, manufacturing cost becomes expensive. In addition, driving the pin 32 into the pin hole requires man hours. Further, assembled weighing dish tends to incline due to precision and errors of the pin driving, or errors occurring in the pin hole and the pins 32, thereby making accurate weighing impossible.

CITATION LIST

Patent Literatures

Patent Literature 1 JP2002-214030 A
Patent Literature 2 JP2009-244129 A

SUMMARY OF THE INVENTION

Technical Problem

It is an object of the present invention to provide an overload prevention mechanism which can be manufactured with high precision and relatively little labor, and which can restrict inclination and rattling of the weighing dish.

Means for Solving the Problems

In order to achieve the above object, an overload prevention mechanism according to a first embodiment of the present invention includes a load receiving part including a support part supporting a weighing dish, a side wall continuously provided downward from the support part, and a flange continuously provided sideways from a vicinity of a lower end of the side wall and having three or more ribs on an upper surface thereof; a pedestal located below the load receiving part; an elastic body brought into contacting with the load receiving part at one end and with the pedestal at the other end, and biasing the load receiving part and the pedestal in a direction to be apart from each other; and a connection member having grooves engaging with the ribs on a lower surface thereof. The three or more ribs are arranged at positions apart from the center of the weighing dish so as to restrict inclination and rattling of the load receiving part due to a load applied to the load receiving part.

(Function) In the overload prevention mechanism configured as mentioned above, the three or more ribs formed on the load receiving part and the grooves of the connection member are engaged and fastened to fix each other. At that time, the plurality of the ribs and the grooves are engaged with each other to restrict the movement in the lateral direction (rotational direction) of the load receiving part against the connection member.

Further, in the overload prevention mechanism according to the first embodiment of the present invention, each of the load receiving part whose flange has the plurality of the ribs, the connection member having the grooves, and the pedestal can be manufactured by molding. In this case, each member can be manufactured easily and highly precisely. In contrast to the conventional art, not only the work itself is facilitated thanks to elimination of pin-driving and cutting, but also it can be expected to improve weighing precision. In other words, with the conventional overload prevention mechanism which needs pin-driving and cutting works, a deterioration in precision of the works directly leads to inclination and rattling of the weighing dish. Moreover, when burrs are generated during the pin-driving and cutting works, they cause rattling of the weighing dish, resulting in a measuring error. Whereas, with the present invention, it is also possible to manufacture each member by molding, thereby solving the problems of the conventional art.

In a second embodiment of the present invention, the overload prevention mechanism according to the first embodiment of the present invention may be configured such that at least one of the ribs is disposed at each of both sides of an arbitrary virtual center line passing through the center of the load receiving part so as to restrict inclination of the load receiving part.

(Function) A typical arrangement is such that an odd number of ribs are formed and disposed at equal intervals in the circumferential direction on the flange of the load receiving part to form vertices of a regular polygon. For example, in the case of three ribs, angle between straight lines connecting the center point (virtual point) of the load receiving part and each rib is 120°. Accordingly, each rib is positioned at each vertex of a regular triangle. Similarly, in the case of five ribs, an angle between straight lines connecting the center point of the load receiving part and each rib is 72°. Accordingly, each rib is positioned at each vertex of a regular pentagon.

Even if three ribs are formed, in the case where angles between straight lines connecting the center point of the load receiving part and each rib are 90°, 90°, and 180°, two of the ribs are positioned on a straight line passing through the center point and the other rib exists at one side of the straight line. In this case, rattling in the rotational direction occurs.

In a third embodiment of the present invention, the overload prevention mechanism according to the first or second embodiment of the present invention may be configured such that the number of the ribs is an odd number.

(Function) In this embodiment, in particular, when the ribs are formed on the flange of the load receiving part in such a way as to form vertices of a regular polygon, the weighing dish returns to the same position each time by a centering action, once the overload is removed.

In a forth embodiment of the present invention, the overload prevention mechanism according to the third embodiment of the present invention may be configured such that the number of the ribs is three, and the three ribs are arranged at equal intervals in a circumferential direction.

(Function) In this embodiment, the ribs are located at vertices of a regular triangle, and the load receiving part and the connection member are securely fixed to each other with the simplest structure. Accordingly, it is possible to absorb impact due to overload, and to provide an accurate measurement value.

In a fifth embodiment of the present invention, in the overload prevention mechanism according to anyone of the first to forth embodiments of the present invention, sections of upper ends of the ribs may have semicircular shapes, the grooves maybe downward V-shaped grooves, and the ribs and the V-shaped grooves may be brought into line contact.

(Function) In this embodiment, the ribs and the V-shaped grooves are brought into line contact. So, even when a load is applied to a position displaced from a position where a specific rib and V-shaped groove are in line contact with each other, the connection member having the V-shaped groove slightly inclines against the rib of the load receiving part and thereafter smoothly returns to its original position by elastic force of the elastic body. Thus, a measurement value can be obtained with high precision. Further, with this embodiment, the sections of the upper ends of the ribs have semicircular shapes, and the ribs are brought into contact with the V-shaped grooves at the semicircular parts. So, a shape precision of the rib is not required for a part other than the semicircular part. Thus, even if burrs are generated, they hardly affect the weighing precision.

Effects of the Invention

With the overload prevention mechanism according to the embodiments of the present invention, in the case where a large load is instantaneously applied to the weighing apparatus such as an electronic balance or the like, equipped with the overload prevention mechanism, the weighing apparatus can be protected. Whereas, in normal use, it can reduce the inclination and rattling of the weighing dish in the rotational direction. Further, each member of the embodiments of the present invention can be manufactured by molding, and it is available more easily and at lower cost than the conventional product.

DESCRIPTION OF THE EMBODIMENTS

Figure 1:
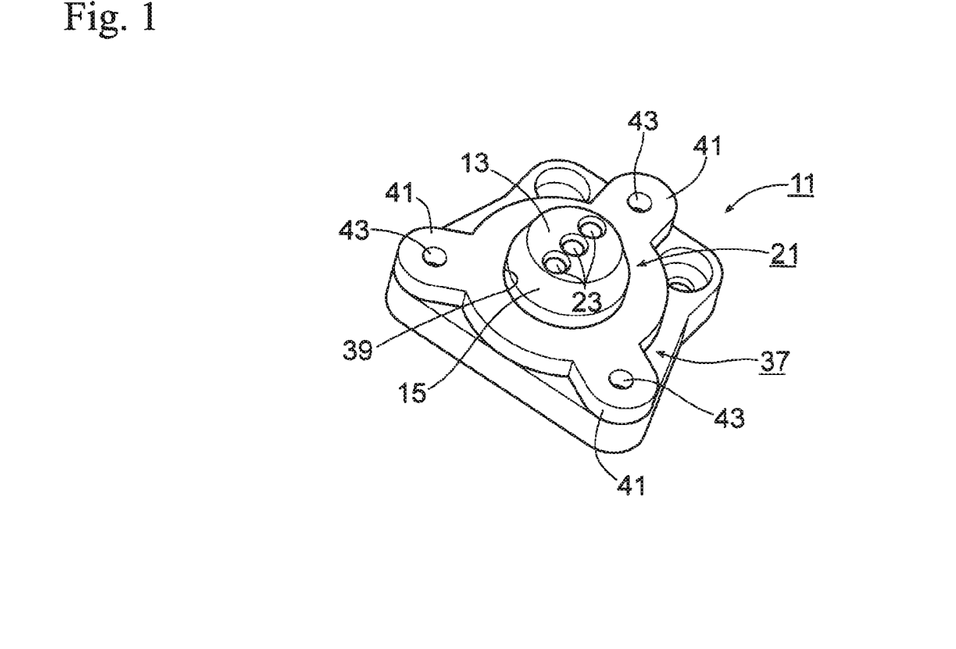
FIG. 1 is a perspective view of an overload prevention mechanism according to one example of the present invention.
Figure 2:
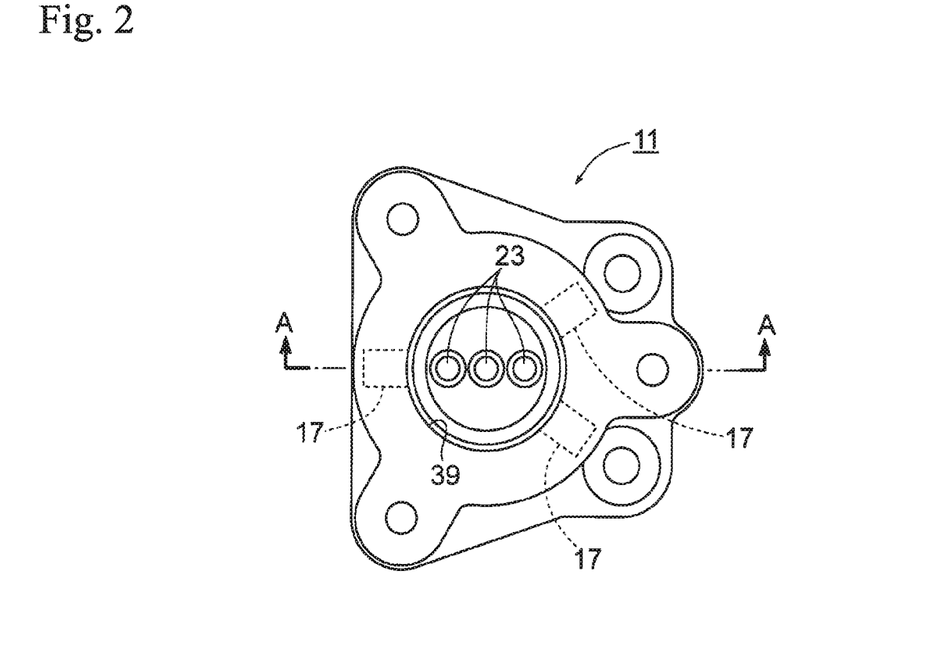
FIG. 2 is a plan view of the overload prevention mechanism of FIG. 1.
Figure 3:
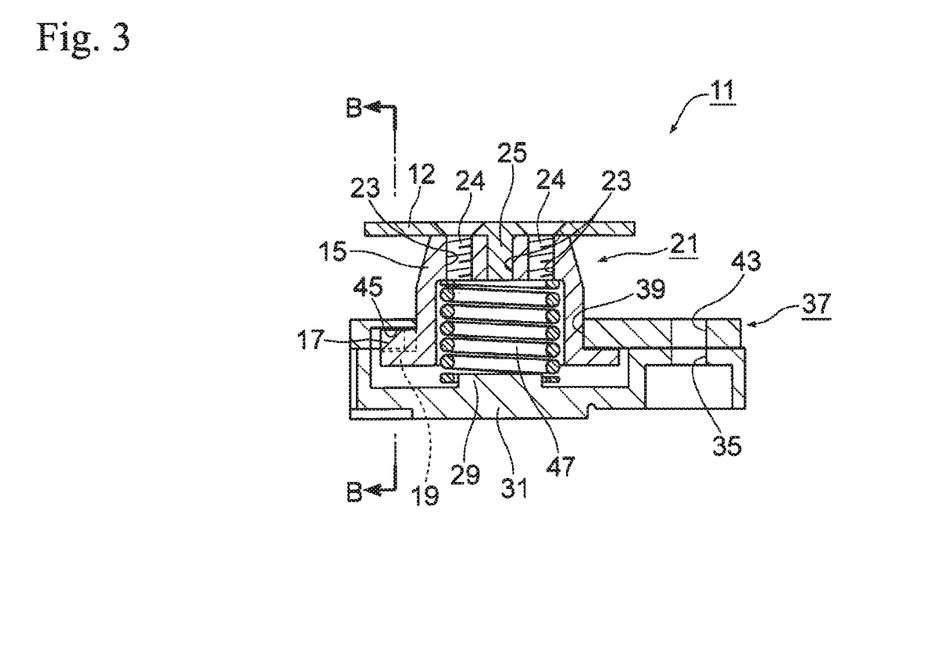
FIG. 3 is a longitudinal sectional view of the overload prevention mechanism with a weighing dish, taken along line A-A of FIG. 2.
Figure 4:
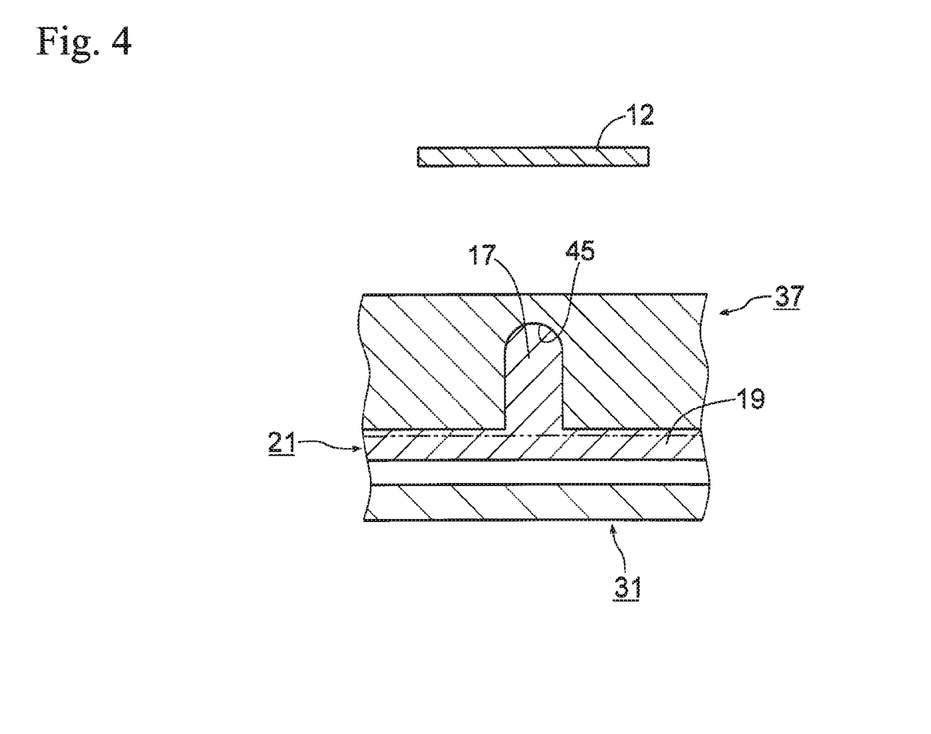
FIG. 4 is an enlarged longitudinal sectional view taken along line B-B of FIG. 3.
Figure 5:
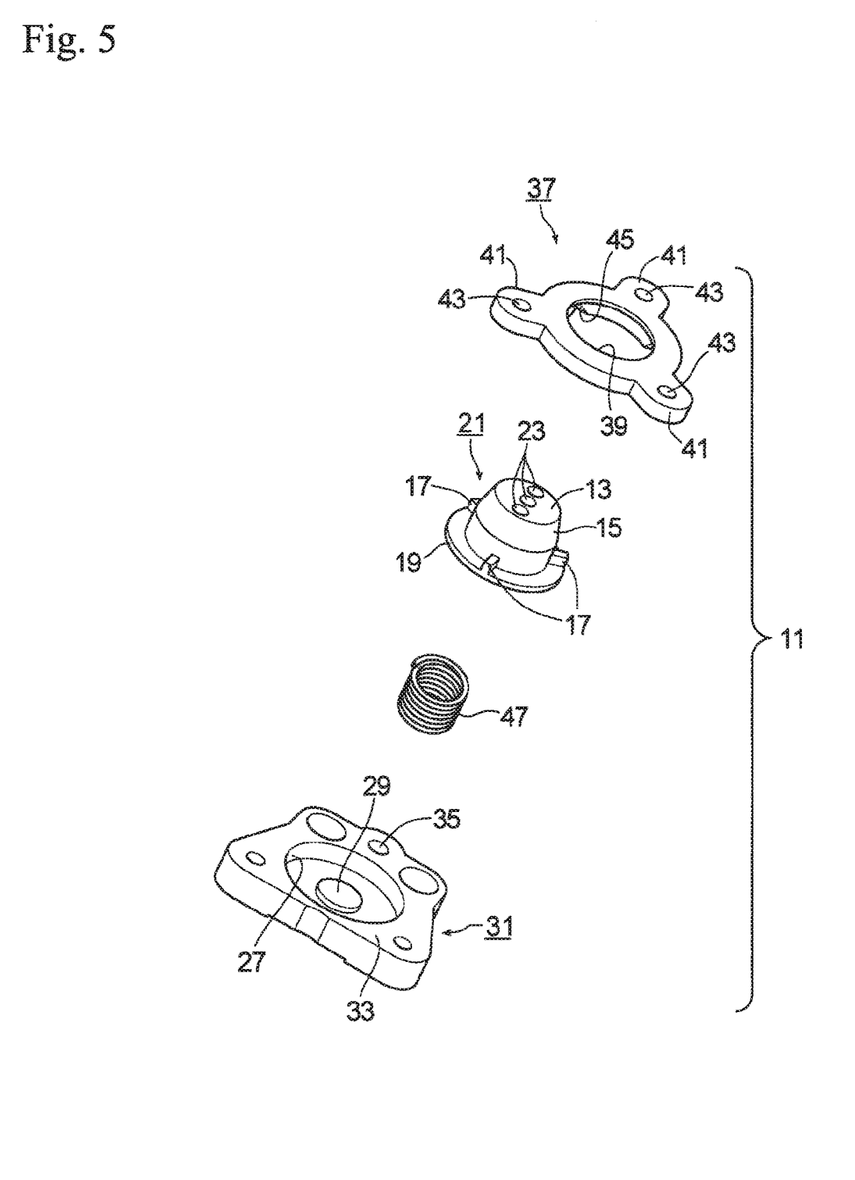
FIG. 5 is an exploded perspective view of the overload prevention mechanism of FIG. 1 viewed from above.
Figure 6:
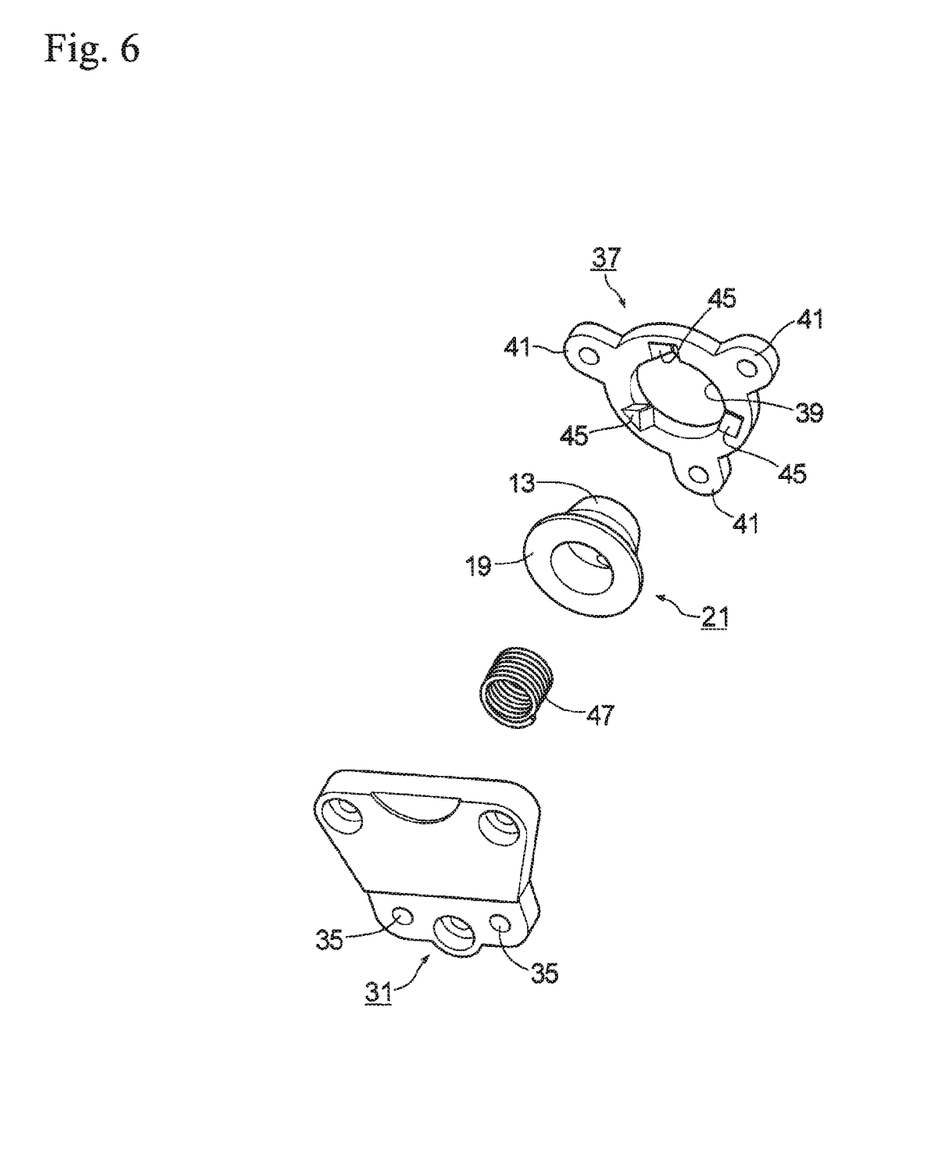
FIG. 6 is an exploded perspective view of the overload prevention mechanism of FIG. 1 viewed from below.

Embodiments of the present invention will now be described in detail. In an example of the present invention shown in FIGS. 1 to 6 (displaying a weighing dish only in FIGS. 3 and 4), an overload prevention mechanism 11 includes a load receiving part 21. The load receiving part 21 includes a relatively thick support part 13 supporting a weighing dish 12, a side wall 15 continuously provided downward from a periphery of the support part 13, and a flange 19 which is provided sideways from a vicinity of a lower end of the side wall 15 and having a plurality of ribs 17, in the illustrated example three ribs, on an upper surface thereof. As shown in FIGS. 1 to 3, three fixing holes 23 are formed and aligned on the support part 13. As shown in FIG. 3, the weighing dish 12 can be fixed by screws 24 to the fixing holes 23.

A circular recess 27 is formed at the center of the lower portion of the load receiving part 21. A pedestal 31 is formed at the center of the upper surface of the recess 27 and the pedestal 31 has an upward projection 29. Three fastening holes 35 in total are formed at a peripheral edge 33 of the pedestal 31 at angle intervals of 120°.

A connection member 37 includes a thorough hole 39 in the center thereof, three bulging portions 41 bulging in three directions from a circular main body and fastening holes 43 each formed in each of the bulging portions 41. Formed on the lower surface of the connection member 37 are a plurality of V-shaped grooves (grooves) 45, in the illustrated example three V-shaped grooves in total, at angle intervals of 120° (see FIG. 6).

The through hole 39 in the center of the connection member 37 is brought into contact with a base of the side wall 15 in the load receiving part 21, so that each of the three ribs 17 whose sections of upper end have semicircular shapes in the flange 19 of the load receiving part 21 is fitted with each of the three V-shaped grooves 45 of the connection member 37.

Disposed between the lower surface of the support part 13 of the load receiving part 21 and the upward protrusion 29 of the pedestal 31 is a spring 47 which is an elastic body. Thus, the spring 47 energizes the load receiving portion 21 and the pedestal 31 in a direction to be apart from each other. The connection member 37 and the pedestal 31 are fixed to each other by fastening a bolt (not shown) between each fastening hole 43 of the connection member and the corresponding fastening hole 35 of the pedestal 31.

FIGS. 7A to 7F are schematic diagrams illustrating arrangements of the plurality of ribs. In the diagrams, the fixing holes of the load receiving part are omitted.

Figure 7A:
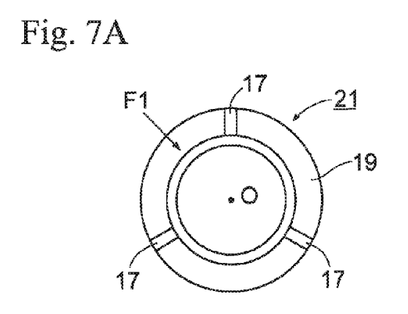
FIGS. 7A to 7F are schematic diagrams illustrating arrangements of a plurality of ribs.

FIG. 7A illustrates an arrangement of the ribs 17 of the load receiving part 21 in the example illustrated in FIGS. 1 to 6. The three ribs 17 are arranged along a circumferential direction of the flange 19 at equal intervals, that is, at angle intervals of 120°, so that vertices of the ribs 17 form a regular triangle. In this arrangement, even when a load transmitted to the load receiving part 21 through the weighing dish is not uniformly dispersed and is unevenly concentrated on one point of the load receiving part 21 (for example, force $F_1$ in FIG. 7A), at least one rib 17 exists on the same side of the point to which the force $F_1$ is applied with respect to the center O in the flange 19 and engages with the V-shaped groove (not shown in FIGS. 7A-7F). Therefore, the force applied to the weighing dish is blocked by an engaging portion of the ribs 17 and the V-shaped grooves, so that the load receiving part 21 (weighing dish) does not rattle in the rotational direction.

Figure 7B:
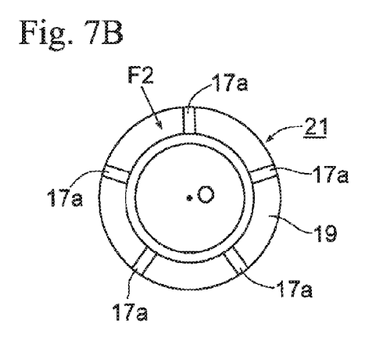

FIG. 7B illustrates an example in which five ribs 17a are arranged along a circumferential direction of the flange 19 at equal intervals, that is, at angle intervals of 72°, so that vertices of ribs 17a form a regular pentagon. Also in this arrangement, even when a load transmitted to the load receiving part 21 through the weighing dish is not uniformly dispersed and is unevenly concentrated on one point of the load receiving part 21 (for example, a force $F_2$ in FIG. 7B), at least one rib 17a exists on the same side of the point to which the force $F_2$ is applied with respect to the center O in the flange 19 and engages with the V-shaped groove. Therefore, the force applied to the weighing dish is blocked by an engaging portion of the rib 17a and the V-shaped groove, so that the load receiving part 21 (weighing dish) does not rattle in the rotational direction.

Figure 7C:
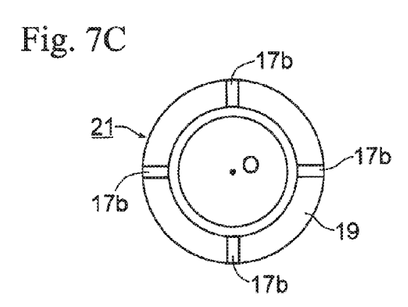

FIG. 7C illustrates an example in which four ribs 17b are arranged in a circumferential direction of the flange 19 at equal intervals, that is, at angle intervals of 90°, so that vertices of the ribs 17b form a regular square. Also in this arrangement, at least one rib 17b exists on each of both side of an arbitrary virtual line passing through the center O of the load receiving part 21. Therefore, the load receiving part 21 (weighing dish) does not rattle in a rotational direction.

Figure 7D:
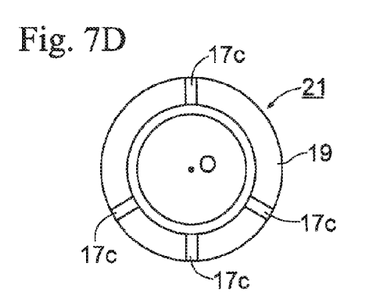

FIG. 7D illustrates an example in which four ribs 17c are arranged in a circumferential direction of the flange 19 at angle intervals of 120°, 60°, 60°, and 120°, in sequence, so that the ribs 17c form an isosceles quadrilateral having the same two adjacent sides. Like this, the present example includes an aspect in which the plurality of the ribs does not form vertices of a regular polygon. In such arrangement, the load receiving part 21 (weighing dish) does not rattle in a rotational direction.

Figure 7E:
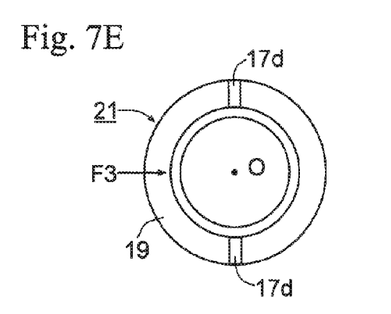

FIG. 7E illustrates an example in which two ribs 17d are arranged at symmetrical points, that is, at angle intervals of 180° in the flange 19. Since the number of the ribs is two, this example is not included in the present invention. In this arrangement, as illustrated in the Figure, when force (for example, a force $F_3$ in FIG. 7E) is unevenly applied in a direction perpendicular to an arbitrary virtual center line passing through the center O, there is no engagement between the ribs 17d and the V-shaped grooves at the side to which the force is applied, so that the load receiving part 21 (the weighing dish) inclines in the direction to which the force is applied.

Figure 7F:
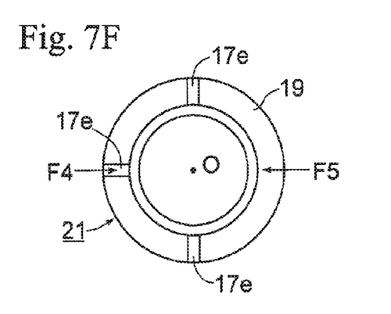

FIG. 7F illustrates an example in which three ribs 17e are arranged in a circumferential direction of the flange 19 at angle intervals of 90°, 90°, and 180°, in sequence, so that the ribs 17e forms vertices of a right-angled isosceles triangle. In this example, when a load transmitted to the load receiving part 21 through the weighing dish is not uniformly dispersed and is concentrated on the rib 17e which is disposed at an angle of 90° from each of two adjacent ribs 17e (for example, a force $F_4$ in FIG. 7F), the rib 17e to which the force is applied engages with the corresponding V-shaped groove, so that the load receiving part 21 (weighing dish) does not rattle in the rotational direction.

However, when a force $F_5$ is applied to a symmetrical point of the point to which the force $F_4$ is applied with respect to the center O, engagement of the rib 17e and the V-shaped groove does not exist on the side to which the force $F_5$ is applied, so that the load receiving part 21 (weighing dish) inclines in a force $F_5$ applying direction. On the other hand, on the side in which the rib 17e exists and to which the force $F_5$ is not applied, an upward moment is generated. The rib 17e is merely engaged with the V-shaped groove by insertion. Thus, the rib 17e cannot resist the upward moment, so that the load receiving part 21 moves to float up. Consequently, it is impossible to avoid the inclination of the weighing dish. Therefore, this aspect is not included in the present example.

The operation of the overload prevention mechanism 11 of the present example having the above-described configuration will be described. The overload prevention mechanism 11 is disposed between a load transmission mechanism including a load detection unit such as an electromagnetic-force-balancing sensor and a weighing dish in a weighing apparatus, and the weighing apparatus is installed in a manufacturing line or the like. On the weighing dish 12, various kinds of weighing objects are sequentially placed, and in some cases, a large impact may be applied. If such impact cannot be absorbed, rattling or inclination occurs on the weighing dish 12, which makes it impossible to perform measurement with high precision.

In the present embodiment illustrated in FIGS. 1 to 6 is configured such that the load receiving part 21 including the flange 19 with three ribs 17 and the connection member 37 with V-shaped grooves 45 engaging with the rib s17 on the lower surface are coupled by tightening each other. The ribs 17 are arranged so as to restrict rattling of the load receiving part 21 (weighing dish) in the rotational direction due to the load applied to the load receiving part. Therefore, even when a load is applied to any point of the load receiving part, the load receiving part 21 (weighing dish) is prevented from rattling in the rotational direction of the load receiving part thanks to the plurality of ribs 17 and the V-shaped grooves 45 engaging with the ribs 17. Thereby, measurement can be carried out with high precision and smoothness.

REFERENCE NUMBER LIST

11 Overload prevention mechanism
12 Weighing dish
17, 17a-17e Ribs
19 Flange
21 Load receiving part 31 Pedestal
37 Connection member
45 Groove (V-shaped groove)
O Center
$F_1$-$F_5$ Force

What is claimed is:

1. An overload prevention mechanism comprising:
   a load receiving part comprising
      a support part supporting a weighing dish,
      a side wall continuously provided downward from the support part, and
      a flange continuously provided sideways from a vicinity of a lower end of the side wall, and having three or more ribs on an upper surface thereof;
   a pedestal located below the load receiving part and having a fastening hole at a peripheral edge thereof;
   an elastic body in contact with the load receiving part at one end and with the pedestal at the other end, and biasing the load receiving part and the pedestal in a direction to be apart from each other; and
   a connection member having grooves engaging with the ribs on a lower surface thereof, having a through hole in the center thereof and having a fastening hole at a bulging portion,
   the three or more ribs being disposed in such a manner that at least two of the ribs are disposed at each of both sides of a horizontally disposed line passing through at least one of the ribs and intersecting a vertical center line of the load receiving part so as to restrict inclination and rattling in a rotational direction of the load receiving part due to a load applied to the load receiving part, and
      the side wall being fitted with the through hole, so that the lower part of the side wall is brought into contact with the through hole of the connection member, the connection member and the pedestal being fixed to each other by fastening between the fastening hole of the connection member and the corresponding fastening hole of the pedestal.

2. The overload prevention mechanism according to claim 1, wherein the three or more ribs are arranged at equal intervals in a circumferential direction around the center of load receiving part.

3. The overload prevention mechanism according to claim 2, wherein the number of the ribs is an odd number.

4. The overload prevention mechanism according to claim 2, wherein sections of upper ends of the ribs have semicircular shapes, the grooves are downward V-shaped grooves, and the ribs and the V-shaped grooves are brought into line contact.

5. The overload prevention mechanism according to claim 3, wherein the number of the ribs is three, and the ribs are arranged at equal intervals in a circumferential direction.

6. The overload prevention mechanism according to claim 3, wherein sections of upper ends of the ribs have semicircular shapes, the grooves are downward V-shaped grooves, and the ribs and the V-shaped grooves are brought into line contact.

7. The overload prevention mechanism according to claim 5, wherein sections of upper ends of the ribs have semicircular shapes, the grooves are downward V-shaped grooves, and the ribs and the V-shaped grooves are brought into line contact.

8. The overload prevention mechanism according to claim 1, wherein the number of the ribs is an odd number.

9. The overload prevention mechanism according to claim 8, wherein the number of the ribs is three, and the ribs are arranged at equal intervals in a circumferential direction.

10. The overload prevention mechanism according to claim 8, wherein sections of upper ends of the ribs have semicircular shapes, the grooves are downward V-shaped grooves, and the ribs and the V-shaped grooves are brought into line contact.

11. The overload prevention mechanism according to claim 9, wherein sections of upper ends of the ribs have semicircular shapes, the grooves are downward V-shaped grooves, and the ribs and the V-shaped grooves are brought into line contact.

12. The overload prevention mechanism according to claim 1, wherein sections of upper ends of the ribs have semicircular shapes, the grooves are downward V-shaped grooves, and the ribs and the V-shaped grooves are brought into line contact.

* * * * *